Aug. 29, 1967  L. T. FINNERTY  3,338,453
METHOD AND MEANS FOR PROPORTIONALLY MIXING LIQUIDS
Filed Sept. 17, 1964

INVENTOR.
LOGAN T. FINNERTY
BY Naylor & Neal
ATTORNEYS

United States Patent Office 3,338,453
Patented Aug. 29, 1967

3,338,453
METHOD AND MEANS FOR PROPORTIONALLY MIXING LIQUIDS
Logan T. Finnerty, San Mateo, Calif.; said Logan T. Finnerty and Florence C. Finnerty as joint tenants
Filed Sept. 17, 1964, Ser. No. 397,258
1 Claim. (Cl. 220—23.83)

The present invention relates to a proportioning device for use in establishing a constant ratio between fluids to be mixed and more particularly is directed to such a device of simple construction and operation which is ideally suited for use in mixing cleaning solutions and the like.

In the prior art, various techniques and devices have been provided for the proportional mixing of fluid media. The most usual technique simply calls for independently measuring the media prior to the mixing to establish a predetermined ratio therebetween. Where this technique is used in mixing batches of varying volumes, calculation is required to determine the amount of each fluid medium required for each batch of a different volume. Once such a calculation is made, measuring of the fluid media to be mixed in calibrated devices and subsequent mixing is necessary.

Prior art proportioning devices which have been developed in attempts to overcome the aforedescribed relatively complex technique may be divided into two general categories. The first of these simply provide containers having relative volumes of a specific ratio for use in measuring fluid media to be mixed. These devices have the disadvantage that they are only useful in mixing a batch of a single predetermined volume. The second category of devices utilizes special measuring containers with markable indicia, which indicia are marked according to the amount of fluid medium contained in a main mixing container. The mark so provided indicates the degree to which the measuring containers must be filled to contain a volume which establishes a predetermined ratio when compared to the volume of fluid medium contained in the main mixing container. Arrangements in the latter category have the disadvantage that containers must be provided with special marking indicia and once marked must be carefully filled only to the degree indicated by the indicia.

It is, accordingly, a principal object of the present invention to provide a proportioning device overcoming the disadvantages of prior art techniques and devices.

Another object of the invention is to provide a proportioning device of a simple rugged construction which may be used with a minimum of effort.

A further object of the invention is to provide a proportioning device of inexpensive construction which is well suited for commercial distribution together with an additive, such as a cleaning detergent.

Still another object of the invention is to provide a proportioning device for use with a main mixing vessel, which device may be used to measure an additive for the vessel either before or after the filling of the vessel with a diluent.

Yet a further and more specific object of the invention is to provide a proportioning device which employs a readily usable visual comparator requiring no mathematical calculation.

The proportioning device of the invention is intended for use in combination with a vessel in which the fluid level may be observed, such as a bucket, to facilitate the addition of a fluid medium to the fluid in this vessel in a predetermined ratio. Basically, the device may be defined as a flask so proportioned that upon being positioned in predetermined orientation relative to said vessel the ratio of the volume of the fluid medium contained therein at any level relative to the volume of fluid contained in the vessel at a corresponding level is a predetermined constant.

The basic device is completed by means to facilitate the visual leveling of a fluid medium in the flask with fluid in the vessel when the flask is positioned in the predetermined orientation and a mounting element to position the flask in said orientation.

The detailed structure and operation of the invention and the foregoing and other objects will be more apparent when viewed in light of the accompanying drawings, wherein.

Figure 1:
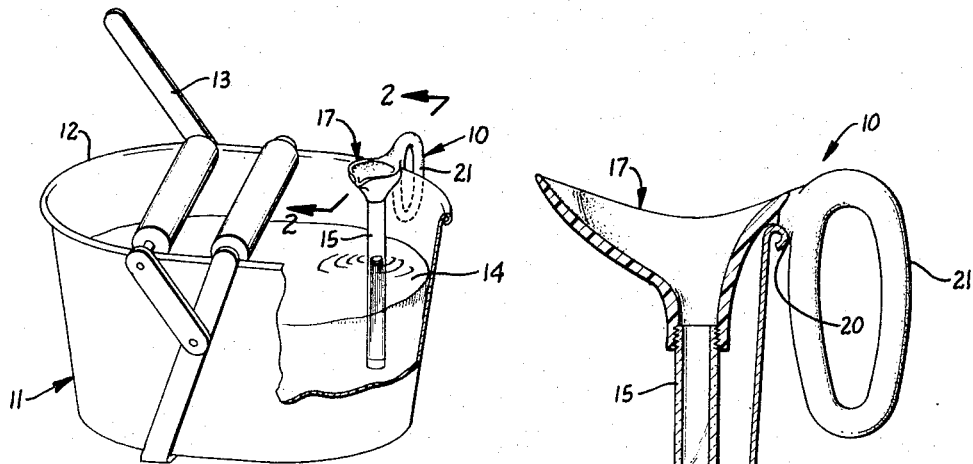
FIG. 1 is a perspective view illustrating one embodiment of the inventive device as it is being used on a conventional mop bucket.
Figure 2:
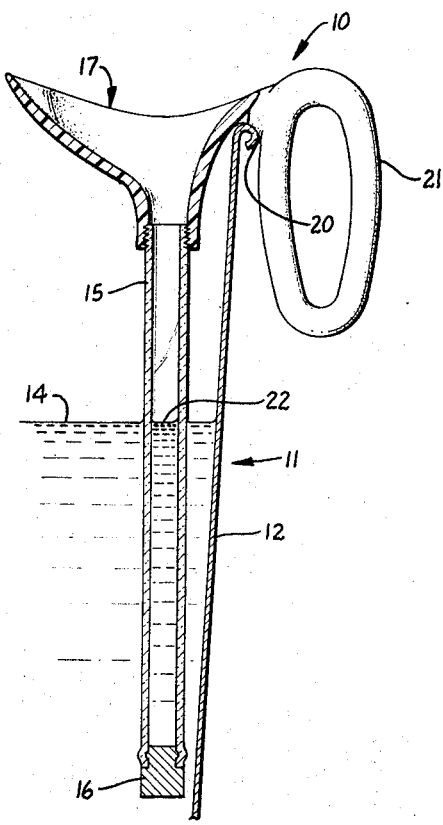
FIG. 2 is a sectional view taken on line 2—2 of FIG. 1.
Figure 3:
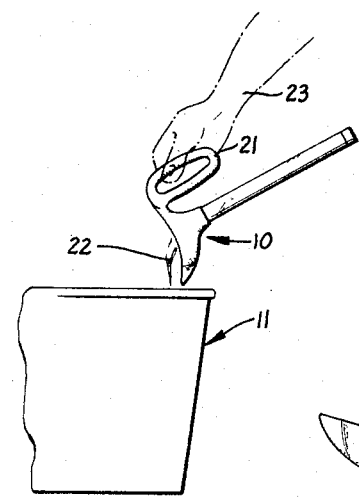
FIG. 3 is an elevational view of the embodiment of the invention shown in FIG. 1 as it is being used to discharge a proportioned amount of additive; and, FIG. 4 is an elevational view of a modified embodiment of the inventive device.

Referring now to FIGS. 1–3, the embodiment of the proportioning device therein is designated in its entirety by the numeral 10 and is shown being used in combination with a mop bucket 11. The bucket 11 is of conventional character and includes an annular sidewall 12 having a wringer mechanism 13 mounted thereabove. In the condition illustrated in FIGS. 1 and 2, the bucket 11 is shown as being filled to an intermediate level with water 14.

The proportioning device 10 comprises a transparent tubular member 15 closed at its lower end by a weighted stopper 16 and having secured to the open upper end thereof a funnel-shaped spout 17. The stopper 16 is of sufficient weight to assure that the member 15 will not be displaced by buoyancy effects when submerged in a fluid medium, such as the water 14. The spout 17 has formed integrally therewith a hooked-shaped portion 20 which terminates in the handle section 21. The portion 20 and spout 17 are so dimensioned that the portion is adapted to hook over the sidewall 12 of the bucket 11 to position the flask formed by the member 15 and stopper 16 in the orientation illustrated in FIGS. 1 and 2. As so orientated, the closed lower end of the flask is substantially coincident with the bottom of the bucket and the open upper end of the flask is disposed at a level above the level to which the bucket is normally filled.

At this point, it is noted that although the bucket 11 forms no part of the present invention, its physical characteristics are important to the design of the proportioning device. Specifically, the dimensions of the bucket determine the design required to orientate the flask in the bucket as described above. Furthermore, to function properly, the flask formed by the member 15 and spout 17 must be so proportioned that upon being positioned in predetermined orientation relative to the bucket, the ratio of the volume of fluid contained therein at any level to the volume of fluid contained in the bucket at a corresponding level is a preselected constant. This ratio is selected to correspond to the dilution ratio recommended by the manufacturer of an additive, such as a detergent, to be added to the water 14.

The application of the aforedescribed device will now be described with reference to the embodiment illustrated in FIGS. 1–3. In this embodiment, the device 10 is designed for use with the bucket 11 and a specific liquid detergent. The detergent in this case is designated by the numeral 22. The application is accomplished simply by mounting the device 10 as shown in FIGS. 1 and 2; filling the bucket 11 and member 15 to the same level with water and detergent, respectively; and dumping the detergent into the bucket as shown in FIG. 3. The ease with which the device 10 may be manipulated is emphasized by the hand 23 shown in FIG. 3 as grasping the handle section 21.

Attention is now directed to the ease with which fluids in the tubular member 15 and bucket 11 are leveled during the aforedescribed application. Specifically, by visually and simultaneously observing the upper surfaces of the water 14 and detergent 22, these surfaces may be readily established at the same level. In establishing this level, the bucket 11 is preferably first filled to the desired level and then the tubular member 15 is filled to the same level. It is to be understood, however, that this procedure may be reversed by first filling the tubular member and then the bucket. In the latter case, means to weight the tubular member against buoyancy effects may be omitted. In either filling sequence the transparent wall of the tubular member 15 facilitates the visual observation of the water and detergent surfaces and thus their leveling.

Figure 4:
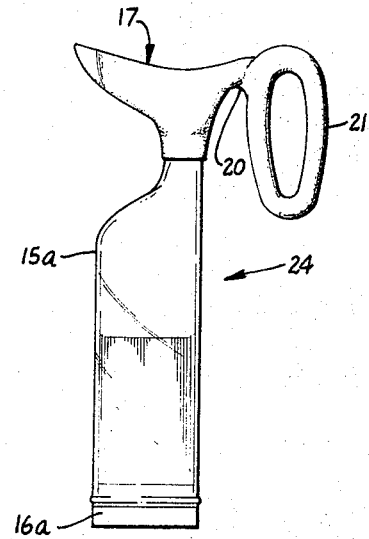

FIG. 4 illustrates a proportioning device 24 differing from the aforedescribed device 10 only in that it incorporates a tubular member 15a and stopper 16a which are larger than the corresponding elements of the device 10. Accordingly, identical elements in the devices 10 and 24 are designated by corresponding numerals. The illustration of FIG. 4 is merely intended to show how the proportions of the inventive device may be modified for use under conditions differing from those of FIGS. 1–3. Specifically, as compared to the device 10, the device 24 would be for use with either a weaker detergent or a larger bucket.

*Example*

When using the aforedescribed device under the following conditions:

(1) With a 32 quart round bucket having an inside diameter of 14 inches and an inside depth of 13 inches; and,
(2) With Johnson's "Forward" liquid cleaner having a recommended dilution ratio of one quart to 40 parts of water (manufactured by S. C. Johnson & Son, Inc., Racine, Wis.);

the device of the present invention could have a transparent cylindrical measuring member (corresponding to the aforedescribed members 15 and 15a) with the following characteristics:

(1) An inside length of 13 inches; and,
(2) An inside diameter of 2.20 inches.

To conclude, from the foregoing description it is believed that the present invention enables the accomplishment of the objects initially set forth herein. In particular, a proportioning device of simple and nontechnical operation is provided for adding the correct amount of detergent to water in the mixing of cleaning solution. It is to be understood, however, that the invention is not intended to be limited to the specific embodiments illustrated and described, but rather is defined by the following claim.

What is claimed is:

To enable the establishment of a predetermined volume to volume admixture ratio between two liquids before said liquids are mixed together, the combination comprising:
(a) a bucket-like, open-top vessel;
(b) a volume of a first liquid filling said vessel up to a predetermined level;
(c) an elongated flask having a closed lower end and an open upper end;
(d) means supporting said flask within said vessel in an upright position;
(e) a volume of a second liquid filling said flask from the closed lower end thereof up to said predetermined level, the ratio of the volume of first liquid to the volume of second liquid corresponding to said admixture ratio.

References Cited

UNITED STATES PATENTS

| | | | |
|---|---|---|---|
| 293,986 | 2/1884 | Stover | 141—340 |
| 2,161,060 | 6/1939 | Kelsey. | |
| 2,385,648 | 9/1945 | Prager. | |
| 2,631,608 | 3/1953 | Rosenberg. | |
| 2,712,396 | 7/1955 | Mowat | 220—85 |
| 3,151,798 | 10/1964 | Meagher. | |

THERON E. CONDON, *Primary Examiner.*

GEORGE E. LOWRANCE, *Examiner.*